(12) United States Patent
Nordquist et al.

(10) Patent No.: US 6,674,041 B2
(45) Date of Patent: Jan. 6, 2004

(54) SINTERED HOLDER FOR A WORKPIECE OR TOOL

(75) Inventors: Hakon Nordquist, Täby (SE); Christer Modin, Kista (SE)

(73) Assignee: System 3R International AB, Vaellingby (SE)

( * ) Notice: Subject to any disclaimer, the term of this patent is extended or adjusted under 35 U.S.C. 154(b) by 1 day.

(21) Appl. No.: 10/167,686

(22) Filed: Jun. 10, 2002

(65) Prior Publication Data

US 2002/0185472 A1 Dec. 12, 2002

(30) Foreign Application Priority Data

Jun. 11, 2001 (DE) .......................... 101 28 097

(51) Int. Cl.[7] ............................. B23H 1/00
(52) U.S. Cl. .................. 219/69.15; 269/309; 279/4.04; 279/133; 409/234
(58) Field of Search .................. 219/69.11, 69.15; 409/234; 279/4.04, 4.06, 133; 403/13, 354; 269/309, 290

(56) References Cited

U.S. PATENT DOCUMENTS

| 4,855,558 | A | * | 8/1989 | Ramsbro | .................. 219/69.15 |
| 4,861,011 | A | * | 8/1989 | Varga | |
| 5,036,579 | A | * | 8/1991 | Buchler | ...................... 269/309 |
| 5,791,803 | A | | 8/1998 | Nordquist | |
| 6,036,198 | A | * | 3/2000 | Kramer | .................... 219/69.15 |
| 6,160,236 | A | * | 12/2000 | Nordquist | ................ 219/69.15 |
| 6,172,319 | B1 | * | 1/2001 | Franzen | |

FOREIGN PATENT DOCUMENTS

| DE | 30 03 756 | 5/1984 |
| DE | 42 14 355 | 11/1993 |
| EP | 0 255 042 | 8/1989 |
| EP | 1 068 919 | 4/2002 |

* cited by examiner

Primary Examiner—Geoffrey S. Evans
(74) Attorney, Agent, or Firm—Bachman & LaPointe, P.C.

(57) ABSTRACT

A holder for a workpiece or tool, in the surface of which a plurality of grooves with substantially planar flanks are made, the opposing edges of which, formed on the surface, have a predetermined spacing, wherein the holder consists of a sintered material, at least in the region of the elastically deformable edges.

15 Claims, 3 Drawing Sheets

SINTERED HOLDER FOR A WORKPIECE OR TOOL

BACKGROUND OF THE INVENTION

The invention relates to a holder for a workpiece or a tool, in the surface of which a plurality of grooves with substantially planar flanks are made, the opposing edges of which, formed on the surface, have a predetermined spacing. Holders of this type are used for clamping for example a workpiece to be worked onto a chuck of a machine tool, for instance an electrical discharge machine.

European Patent Specification 255 042 discloses a clamping device for a tool on a machine tool which substantially comprises a chuck fastened on the machine and a holder for the tool. The holder can be released as desired from the chuck and clamped again onto the chuck by means of a clamping device. In order that the holder is always clamped onto the chuck in exactly the same position within a plane perpendicular to the clamping direction, usually the x-y plane, reference elements which interact during clamping are provided on the chuck and on the holder and include prismatic pins protruding axially from the chuck and pairs of opposing lips on the holder. The alignment of the holder in relation to the chuck is brought about by prismatic surfaces present on the prismatic pins engaging between the axially elastic lips of a pair of lips each. However, considerable outlay is involved in producing a holder of this type.

Another way of aligning the holder and chuck is disclosed by the electrode securing device according to DE-A-3003756, in which frustoconical pins projecting axially from the chuck enter prismatic grooves of the holder. Since neither the grooves nor the pins have axially elastic elements lying in between, the often considerable axial clamping forces during clamping readily lead to a permanent deformation either of the groove flanks or of the prismatic surfaces on the pins, which impairs the reproducing accuracy of the alignment of the holder in relation to the chuck.

In the document EP 1 068 919 A1, a device is presented for the position-defined clamping of a workpiece in the working area of a machine tool which has a chuck and a tool carrier. If, in preparation for the clamping, the tool carrier, provided with stepped depressions, is placed onto the chuck equipped with centering pins in such a way that an intermediate space of only a few hundredths of a millimeter remains, the centering pins butt against the inner steps of the depressions. During the subsequent clamping, the steps are elastically deformed by the centering pins. A displacement of the tool carrier between release and clamping by the chuck of only several hundredths of a millimeter under a clamping force of usually several thousand newtons requires considerable outlay to be invested in the clamping device.

The tool holder described in the document U.S. Pat. No. 5,791,803 is inexpensive to produce, but has no grooves, so that it cannot be used in a clamping system which is explained in the cited document EP-B-255 042.

SUMMARY OF THE INVENTION

The invention is based on the object of providing a workpiece or a tool holder which can be produced inexpensively and can be used primarily in the clamping system according to EP 255 042.

In the case of the holder stated at the beginning, it is provided according to the invention that the holder consists of a sintered material, at least in the region of the elastically deformable edges. This achieves an elasticity of the edges of the sintered material with respect to the clamping pressure, which on the one hand rules out the possibility of any plastic deformation of the edges or the prismatic surfaces during clamping and on the other hand nevertheless ensures excellent reproducing accuracy in the positioning of the holder in relation to the chuck. A holder of this type can be produced with relatively low costs, has high reproducing accuracy in the positioning, adequate strength and a long service life. At the same time, the chuck can develop a clamping force of approximately 4000 to approximately 8000 N on the holder.

If the holder consists entirely of sintered material, the invention can be expediently realized by using a first type of grains in the surface region, in particular in the region of the groove edges of the holder, and a second, different type of grains for the sintering for the holder core. In one embodiment of the invention, the radial grooves mentioned at the beginning are cut into the planar surface of the holder. The relatively resistant outer groove edges can axially yield elastically under the usual clamping force, on account of the softer sintering material located under them. Such a holder can therefore be successfully used in conjunction with a clamping device known from the mentioned document EP-B-255 042. The holder according to the invention is not only less expensive to produce, but also makes possible, on account of its lower weight, a reduction in the clamping force in relation to a holder consisting of solid tool steel.

The invention allows further advantageous embodiments. For instance, the sintered material may have closed pores which can deform under the clamping pressure. Alternatively, the grains of the sintered material are elastically deformable under clamping pressure. Furthermore, it may prove to be expedient to use a sintered material comprising a plurality of different types of grain, among which nonmetallic grains may also be provided, if appropriate. Furthermore, the sintered material may advantageously comprise a plurality of layers of different types of grain in each case. In addition, it proves to be expedient to give the sintered material a nonisotropic elasticity and, if appropriate, also a vibration-damping property.

For the configurations of the holder according to the invention, consisting entirely of sintered material, it proves to be expedient for special applications if a channel parallel to the respective groove extends on either side of each groove. It alternatively or additionally comes into consideration to make one or more blind holes in the sintered material, parallel to the groove flank, near to each outer groove edge.

BRIEF DESCRIPTION OF THE DRAWINGS

Otherwise, advantageous configurations of the invention are specified in the subclaims. The invention is described below on the basis of the accompanying drawings for the embodiments illustrated there, in which:

DETAILED DESCRIPTION

Figure 1:
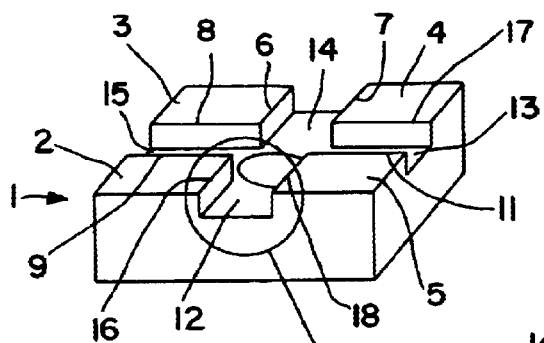
FIG. 1 shows a schematic, perspective view of a holder with the enlargement of a detail.

The holder denoted overall by 1 substantially consists of sintered tool steel, is square in plan view and has a substantially planar upper side, which is formed by four portions 2, 3, 4 and 5 lying in a plane. On the underside 10 of the holder (FIG. 8), a workpiece to be worked or a tool, for example an electrode for electroerosive working, may be permanently fastened. The portions 2, 3, 4 and 5 are separated from one another by grooves 12, 13, 14 and 15 made into the holder 1 from its upper side. The grooves have a rectangular cross section with substantially planar groove flanks and are laid out crosswise in such a way that respective pairs of opposing grooves 12 and 14 and 13 and 15 are in line. The width of the grooves is the same for all the grooves, so that the opposing, parallel edges respectively at a groove on the upper side of the holder, the opposing parallel edges 16, 18 for the groove 12, the opposing parallel edges 11, 17 for the groove 13, the opposing parallel edges 6, 7 for the groove 14 and the opposing parallel edges 8, 9 for the groove 15, have a predetermined spacing from one another.

Figure 2:
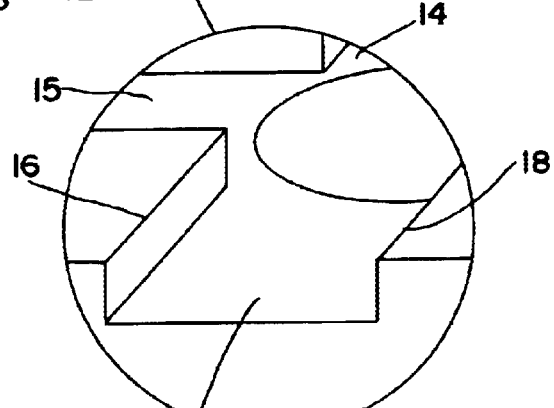
FIG. 2 shows a schematic representation to explain the aligning operation.
Figure 2:
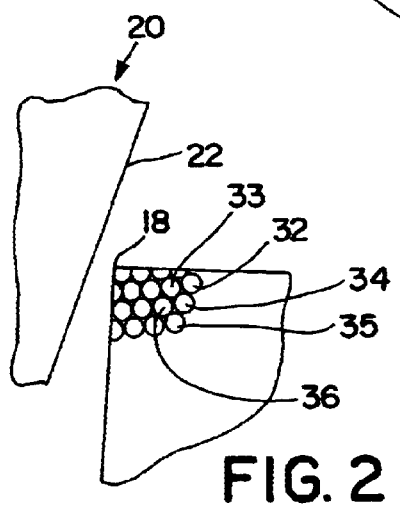

Not shown is a chuck, which matches the holder 1, is fastened on a machine tool and from which a prismatic pin for each groove axially protrudes. Each prismatic pin has a pair of opposing prismatic surfaces, one of which is denoted by 22 for the prismatic pin 20 and is represented in FIG. 2. The width of each groove is dimensioned such that, for aligning the holder 1 with respect to the chuck in an x-y plane parallel to the planar upper side, in each case a prismatic pin, for example prismatic pin 20, enters one of the four grooves 12, 13, 14, or 15, until its prismatic surface 22 is butting against one of the said edges. FIG. 2 shows that the prismatic pin 20 enters the groove 12 and the prismatic surface 22 is in the process of butting against the edge 18 of said groove. It is not shown that the prismatic surface opposing the prismatic surface 22 on the prismatic pin 20 butts against the edge 16 of the groove 12 at substantially the same time. When the prismatic pin 20 penetrates into the groove 12 for aligning the holder, the remaining three prismatic pins enter the further grooves 13, 14 and 15 in a way explained on the basis of the prismatic pin 20. It is clear that each groove has a depth which is adequate for the aligning and clamping and rules out the possibility of the prismatic pin hitting the bottom of the groove.

Figure 3:
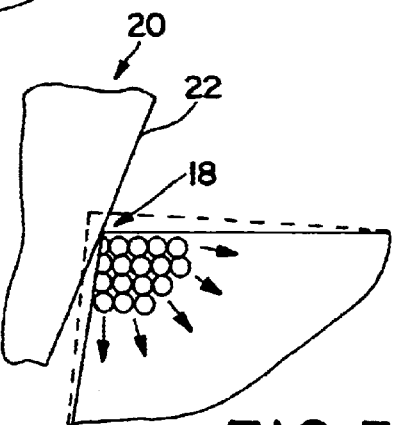
FIG. 3 shows a representation corresponding to FIG. 2 to explain the clamping operation.

According to the invention, the holder 1 consists, at least in the region of the edges 16, 18, 11, 17, 6, 7, 8, 9 of the grooves 12, 13, 14 and 15, of a sintered material, which has spherical, superficially half-melted sintering material grains, of which some are denoted by 32, 33, 34, 35 and 36. Trapped between the grains are closed pores, as can be seen from FIG. 2. Once the holder 1 is aligned to prepare for the clamping onto the chuck, the prismatic surfaces of the prismatic pins are, as mentioned, butting against the edges, initially without any pressure. If the holder and chuck are now clamped together by means of a clamping device (of which a ball locking mechanism is described as an example in the document EP 255 042), the prismatic pins press the sintered material together against the edges, with elastic deformation of the latter, as shown in FIG. 3 by the example of the prismatic pin 20 and the edge 18. Under the effect of the pressure on the edges, either the pores and/or the grains of the sintering material used for the holder can deform elastically, the edges, such as the edge 18 for instance, moving slightly inward and downward. After the holder 1 has been released from the chuck by the clamping device, the holder again resumes the starting shape in the region of its edges (FIG. 2).

The modulus of elasticity of the sintered material from which the holder 1 can be produced lies between approximately 80,000 MPa and 180,000 MPa and is therefore only approximately 40% to approximately 85% of the modulus of elasticity of around 205,000 MPa for tool steel. Very good results were achieved with a sintering material with a modulus of elasticity which lies approximately 15% below that of tool steel.

Figure 4:
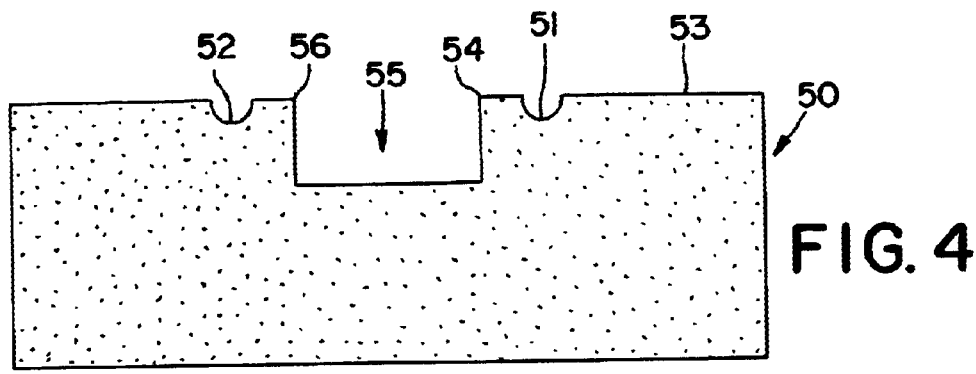
FIG. 4 shows a vertical section through a holder in the region of a groove.
Figure 5:
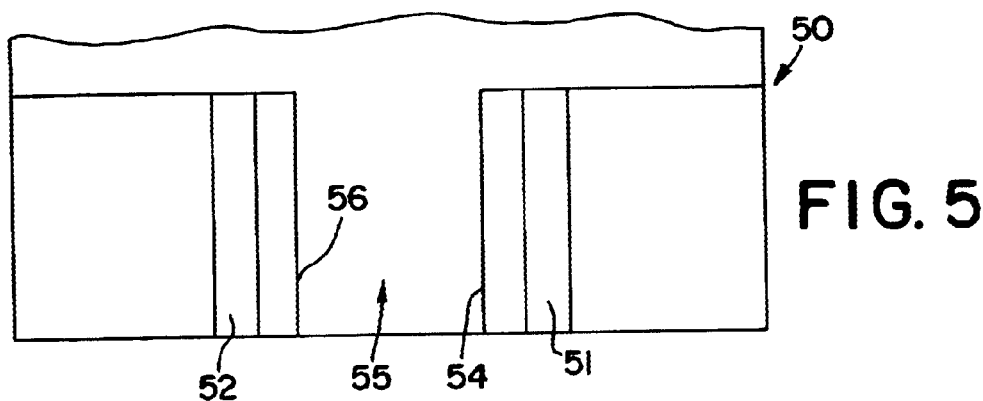
FIG. 5 shows a plan view of the holder according to FIG. 4.

The holder 50 according to FIGS. 4 and 5, which consists entirely of sintered material, has substantially the same outer shape as the holder 1. In addition, channels of substantially semicircular cross section, extending on either side of each of the four crosswise grooves of the holder 50, parallel to the edges, have been pressed into the material of the holder 50 from the upper side 53 of the latter with such a spacing that a greater elastic compliance of the neighboring edges is achieved. This situation is shown in FIGS. 4 and 5 by the example of the groove 55, along which there is formed on either side a respective channel 51 and 52 parallel to the edges 54, 56. In the example represented, the channels 51, 52 extend at a spacing from the edges 54, 56 which corresponds approximately to the width of the latter. To be specific, the width of the channels and their spacing in relation to the neighboring edges are determined by the desired elasticity of the edges 54, 56 during the clamping.

Figure 6:
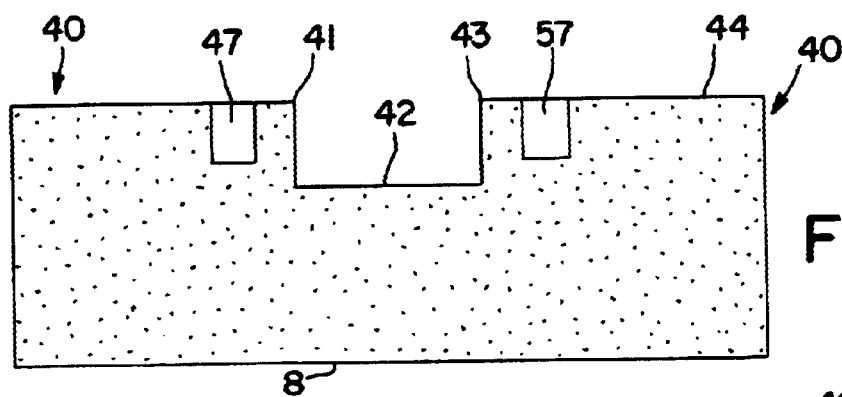
FIG. 6 shows a vertical section through a holder in the region of a groove according to another embodiment.
Figure 7:
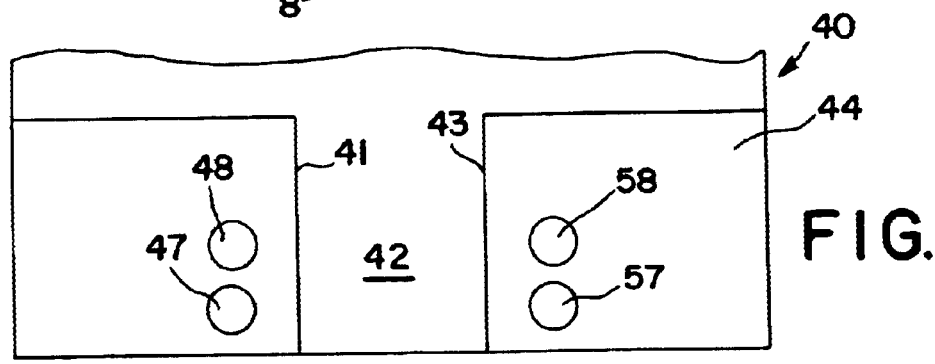
FIG. 7 shows a plan view of the holder according to FIG. 6.

The holder 40 according to FIGS. 6 and 7 again consists of a uniform sintered material; its outer shape is substantially the same as that of the holder 1. In addition, instead of channels, in this exemplary embodiment of the invention a respective row of blind holes has been made into the sintered material of the holder 40, from the upper side 44 of the holder 40, on either side of each groove. The arrangement and depth of the blind holes are shown in FIGS. 6 and 7 by the example of the groove 42. Two cylindrical blind holes 47, 48 and 57, 58 have been pressed into the holder 40 in the axial direction. They regulate the elastic properties of the neighboring groove edges 41, 43. The blind holes 47, 48, and 57, 58 are respectively arranged one behind the other parallel to the groove edges 41, 43. The depth of the blind holes corresponds approximately to the depth of the groove 42; in the example represented it is slightly smaller.

Figure 8:
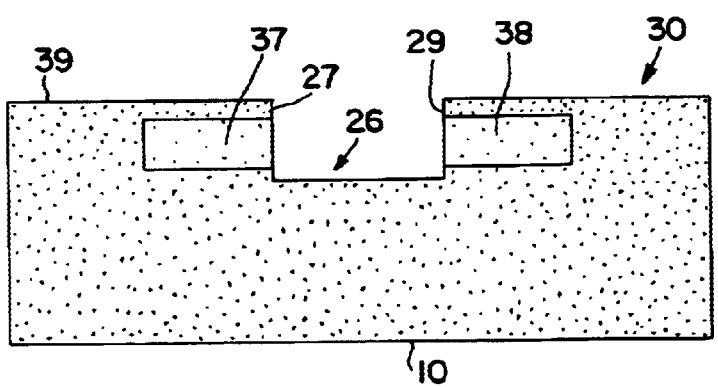
FIG. 8 shows a vertical section through a holder in the region of a groove according to a further embodiment.

The holder 30 represented in section in FIG. 8 has an outer shape which is the same as that of the holder 1. It consists of two different sintered materials. The main mass of the holder 30 consists of a first type of sintering material grains, which produce a relatively hard material after the sintering. The material has been removed in the region of the groove flanks 27, 29 of the groove 26 parallel to the upper side 39 of the holder 30 over the entire length of each groove to a depth which in the exemplary embodiment represented corresponds approximately to the width of the groove 26. These clearances are filled with another material, which consists of a second type of sintering material grains, which produce a softer material after the sintering in relation to the aforementioned material. This backing 37, 38 increases the elasticity of the edges of the groove 26 during clamping and has a vibration-damping effect.

Figure 9:
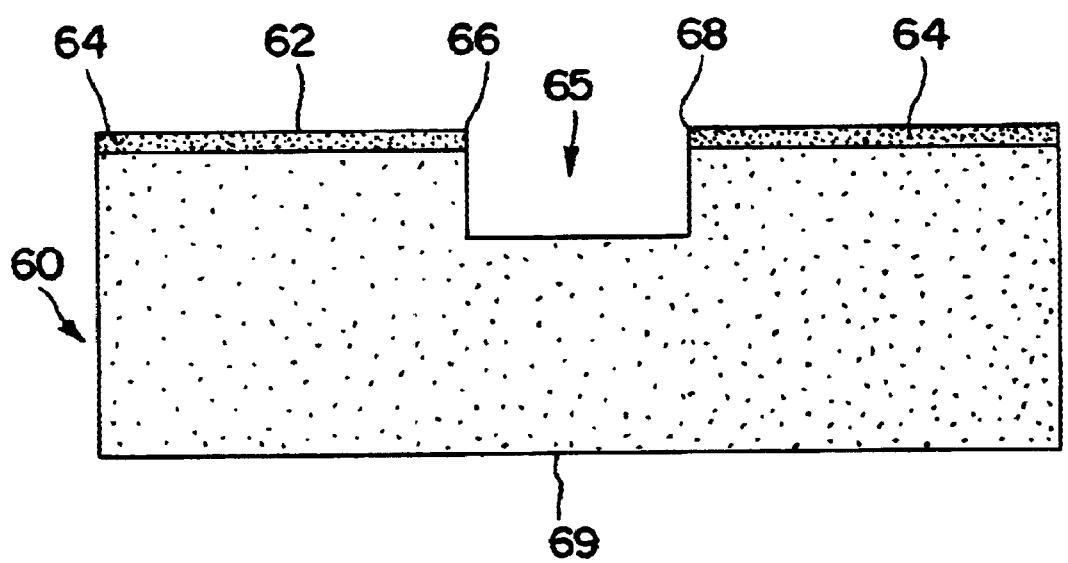
FIG. 9 shows a vertical section through a holder in the region of a groove according to yet a further embodiment.

Finally, FIG. 9 shows in section an embodiment of a holder 60, which is the same in its outer shape as the holder 1. It consists of two different sintered materials. A region 64 which adjoins the upper side 62 and extends over the entire upper side 62 consists of a harder sintered material. It has planar surfaces, which may serve as Z reference surfaces for a chuck (not shown) of a machine tool, in particular an electrical discharge machine. The region 64 is divided in a way corresponding to the four sectors 2, 3, 4, 5 of the holder 1 likewise into four sectors, which are separated from one another by the four crosswise grooves. It also has the edges 66, 68 of the groove 65 and the edges of the further three grooves. The remaining body of the holder 60, including the inner parts of the grooves, consists of a softer sintered material, which is easier to work and has a damping function. On its underside 69, the workpiece to be worked or the tool can be fastened.

A soft, sintered material may consist of sintered aluminum or copper grains, while the harder material may be produced from sintered steel grains. Otherwise, the invention is not restricted to grooves of rectangular cross section. For example, the grooves may also be given a V-shaped or droplet-shaped cross section. Finally, the grooves may be produced from the material of the holder by plastic stamping in case the holder consists of sintered material at least in a region around the grooves.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A holder for a workpiece or tool, in the surface (2, 3, 4, 5; 39; 44; 62) of which a plurality of grooves (12, 13, 14, 15; 26; 42; 55; 65) with substantially planar flanks are made, the opposing edges (16, 18, 11, 17, 8, 9; 41, 43; 54, 56) of which, formed on the surface, have a predetermined spacing, wherein the holder consists of a sintered material, at least in the region of the elastically deformable edges.

2. The holder as claimed in claim 1, wherein the sintered material has closed pores which can deform under pressure.

3. The holder as claimed in claim 1, wherein the grains (32, 33, 34, 35, 36) of the sintered material are elastically deformable under pressure.

4. The holder as claimed in claim 1, wherein the sintered material has a plurality of different types of sintering material grains.

5. The holder as claimed in claim 1, wherein the sintered material has a plurality of layers of different types of grain in each case.

6. The holder as claimed in claim 1, wherein the grooves are produced from the material of the holder by plastic stamping.

7. The holder as claimed in claim 1, wherein the sintered material has a nonisotropic elasticity.

8. The holder as claimed in claim 1, wherein the sintered material partly has nonmetallic grains, which if appropriate are arranged in layers.

9. The holder as claimed in claim 1, wherein the sintered material has vibration-damping properties.

10. The holder as claimed in claim 1, wherein regions (37, 38; 47, 48, 57, 58) of the sintered material are provided below the outer groove edges.

11. The holder as claimed in claim 10, wherein the regions extend from the groove flanks (27, 28) substantially parallel to the surface into the holder (30).

12. The holder as claimed in claim 10, wherein blind holes (47, 48, 57, 58) are made into the holder (40), into the sintered material, next to the groove (42), perpendicularly to the surface (44).

13. The holder as claimed in claim 12, wherein a plurality of blind holes are provided on either side next to each groove.

14. The holder as claimed in claim 1, wherein a respective channel (51, 52) parallel to the groove extends on either side of each groove.

15. The holder as claimed in claim 1, wherein it consists altogether of sintered material.

* * * * *